US011124301B2

(12) United States Patent
Hansson et al.

(10) Patent No.: US 11,124,301 B2
(45) Date of Patent: Sep. 21, 2021

(54) TIERED PASSENGER SEAT CONSOLE ASSEMBLY

(71) Applicant: B/E Aerospace, Inc., Winston-Salem, NC (US)

(72) Inventors: Charles Martin Hansson, Winston-Salem, NC (US); Marc H. Schatell, Winston-Salem, NC (US); Paul A. Evens, Advance, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 271 days.

(21) Appl. No.: 16/219,331

(22) Filed: Dec. 13, 2018

(65) Prior Publication Data

US 2020/0189743 A1 Jun. 18, 2020

(51) Int. Cl.
*B64D 11/06* (2006.01)
*B64D 11/00* (2006.01)

(52) U.S. Cl.
CPC ...... *B64D 11/0605* (2014.12); *B64D 11/0015* (2013.01)

(58) Field of Classification Search
CPC .......... B64D 11/0015; B64D 11/00151; B64D 11/00152; B64D 11/0602; B64D 11/0605; B60R 7/04
USPC ........................................ 244/118.6; 224/541
See application file for complete search history.

(56) References Cited

U.S. PATENT DOCUMENTS

| 4,796,791 | A | * | 1/1989 | Goss | B60N 3/08 |
| | | | | | 108/44 |
| 5,024,398 | A | * | 6/1991 | Riedinger | B64D 11/0015 |
| | | | | | 244/118.5 |
| D326,392 | S | * | 5/1992 | Mondry | B60N 3/002 |
| | | | | | D7/701 |
| 5,170,720 | A | * | 12/1992 | Scheurer | B60N 3/002 |
| | | | | | 108/132 |
| D368,890 | S | * | 4/1996 | Morris | B64D 11/0696 |
| | | | | | D12/419 |
| D430,535 | S | * | 9/2000 | Smith | A47B 23/02 |
| | | | | | D12/419 |
| 6,338,429 | B1 | * | 1/2002 | Pesce | B60R 11/0229 |
| | | | | | 224/275 |
| 6,343,835 | B1 | * | 2/2002 | Ledbetter | A47C 7/62 |
| | | | | | 297/188.2 |
| D598,666 | S | * | 8/2009 | Cloet | B64D 11/0638 |
| | | | | | D6/356 |
| D618,012 | S | * | 6/2010 | Erne | A47B 23/02 |
| | | | | | D6/685 |

(Continued)

*Primary Examiner* — Brady W Frazier
(74) *Attorney, Agent, or Firm* — Suiter Swantz pc llo

(57) ABSTRACT

A console assembly and aircraft passenger seat arrangement including the same, the console assembly including a vertical back panel for affixing to a side wall of a static structure. The console assembly further including upper and lower tiers affixed to and extending horizontally from the vertical back panel, in which the upper tier is above and spaced apart from the lower tier. The lower tier may include a modular front panel for mounting electric devices, such as power ports and in-flight entertainment devices, for example. Thus, the vertical stacking of the upper and lower tiers may allow for condensed stowage space, while maintaining clear visual aesthetics without hiding useful features from view.

6 Claims, 5 Drawing Sheets

(56) References Cited

U.S. PATENT DOCUMENTS

| | | | |
|---|---|---|---|
| 8,096,612 B2 * | 1/2012 | Schumm | B64D 11/0646 297/146 |
| D707,478 S * | 6/2014 | Kapka | B64D 11/0601 D6/716.2 |
| 2008/0121774 A1 * | 5/2008 | Johnson | A47B 23/02 248/311.2 |
| 2009/0121523 A1 * | 5/2009 | Johnson | B64D 11/0693 297/140 |
| 2009/0302158 A1 * | 12/2009 | Darbyshire | B64D 11/06 244/118.6 |
| 2010/0154684 A1 * | 6/2010 | Mayne | B60R 11/00 108/44 |
| 2012/0235453 A1 * | 9/2012 | Bechtold | B64D 11/0696 297/217.1 |
| 2015/0210393 A1 * | 7/2015 | Savian | B64D 11/0015 244/118.6 |
| 2015/0284091 A1 * | 10/2015 | Gow | B64D 11/0638 297/174 R |
| 2016/0016667 A1 * | 1/2016 | Schmidt-Schaffer | B64D 11/0643 244/118.6 |
| 2016/0083094 A1 * | 3/2016 | Clucas | B64D 11/0601 244/118.6 |
| 2017/0008632 A1 * | 1/2017 | Eeberle | B64D 11/062 |
| 2019/0193861 A1 * | 6/2019 | Mehlos | B64D 11/0638 |

* cited by examiner

TIERED PASSENGER SEAT CONSOLE ASSEMBLY

BACKGROUND

Passengers regularly consume food and beverages and interact with devices or other items while traveling on aircraft and other conveyances. Food and beverages, personal electronic devices, and other items may be supplied by a carrier or may be brought on board by passengers. Either way, passengers require a place to secure the consumables, devices, and/or other items to avoid the inconvenience of having to continuously hold these items or store them out of sight and/or reach.

What are desirable are stowage areas that are in plain view and out of the way for improved aesthetics, and that allow passengers greater space and ease during ingress and egress of the passenger seat. Further, a modular configuration of the stowage area provides greater flexibility and easier integration of changing technologies into a variety of seats with differing designs, configurations, spatial arrangements, surrounding furniture, etc. Such stowage areas would be particularly well-suited for use with premium class aircraft passenger seats and suites.

BRIEF SUMMARY

In one aspect, embodiments of the inventive concepts disclosed herein are directed to a console assembly generally including a vertical panel adapted to be affixed to a monument, a lower tier coupled to the vertical panel and having a top surface for placing items and a front surface for installing electric devices, and an upper tier coupled to the vertical panel above and spaced apart from the lower tier. The lower tier may include a lower stowage cutout formed in a back surface thereof, near the vertical panel, and a lower stowage depression formed in the top surface of the lower tier. The upper tier may include an upper stowage cutout formed in a rear of the upper tier near the vertical panel and directly above and aligned with the lower stowage cutout, wherein the upper stowage cutout is continuous from a top to a bottom of the upper tier.

In another aspect, the lower tier may extend beyond the upper tier away from the vertical panel.

In a further aspect, the upper tier may further include a lip extending horizontally from the top of the upper tier and a light disposed in the lip directed to shoine light toward the lower tier to illuminate the lower tier.

In a further aspect, the electric devices housed in the lower tier may include at least one of a power port, a data port, and an in-flight entertainment control panel.

In a further aspect, the lower and upper stowage depressions may be cylindrical and vertically aligned such that an item disposed in the two stowage depressions can seat in the lower stowage depression and be retained by the upper stowage depression.

In a further aspect, the lower tier may further include a debossed portion in the top surface thereof, disposed forward of the upper tier, for containment.

In another aspect, embodiments of the inventive concepts disclosed herein are directed to an aircraft passenger seat arrangement, including a passenger seat and a console positioned atop a monument disposed to one side of the passenger seat. The console may include a vertical panel affixed to the monument, an upper tier affixed to the vertical panel, a lower tier affixed to the vertical panel, below and spaced apart from the upper tier, a first stowage compartment, and a second stowage compartment, adjacent to the first stowage compartment. The first stowage compartment may include a first lower portion, formed between a back wall of the lower tier and a front face of the vertical panel, and a first upper portion, vertically aligned with the first lower portion and formed between a back face of the upper tier and the front face of the vertical panel. The second stowage compartment may include a second lower portion, formed in a top surface of the lower tier, and a second upper portion, vertically aligned with the second lower portion and formed through the upper tier.

In another aspect, the lower tier may extend horizontally beyond the upper tier away from the vertical panel.

In a further aspect, the upper tier may include a light for illuminating the lower tier.

In a further aspect, the lower tier may include a front panel, in which electric devices are mounted.

In a further aspect, the electric devices may include at least one of a power port, a data port, and an in-flight entertainment device.

In a further aspect, the front panel of the lower tier may include at least two faces oriented at an angle to one another.

In another aspect, embodiments of the inventive concepts disclosed herein are directed to a console assembly including a vertical panel adapted to be affixed to a side wall of a static structure, an upper tier coupled to and extending horizontally from the vertical panel, and a lower tier, below and spaced apart from the upper tier, the lower tier coupled to and extending horizontally from the vertical panel beyond the upper tier. The upper tier may include a first storage area, and the lower tier may include a second storage area and a modular front panel for mounting electric devices.

In a further aspect, the first storage area of the upper tier may be enclosed and include a door.

In a further aspect, the first storage area of the upper tier may extend vertically through the lower tier.

In a further aspect, the second storage area of the lower tier may extend vertically through the upper tier.

In a further aspect, the upper tier may include a light for illuminating the lower tier.

In a further aspect, the lower tier may include a third storage area, depressed into a top surface of the lower tier.

In a further aspect, the electric devices may include at least one of a power port and a data port.

In a further aspect, the electric devices may include an in-flight entertainment device.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature or function. In the drawings.

DETAILED DESCRIPTION OF EXEMPLARY EMBODIMENTS

Figure 1:
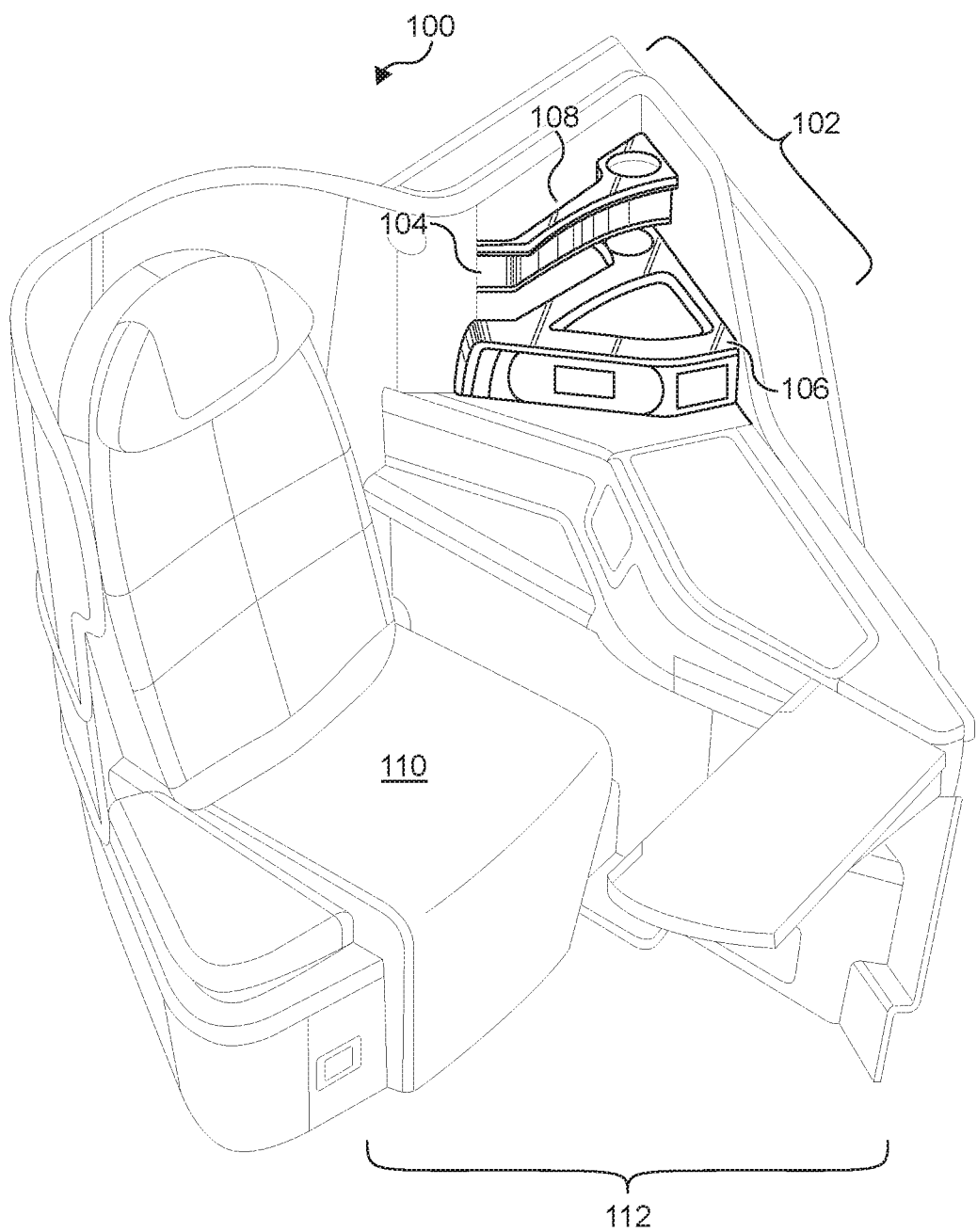
FIG. 1 is a perspective view of a non-limiting example of a console assembly within an environment of a premium class aircraft passenger seat, in accordance with embodiments of the present disclosure.

The inventive concepts are described hereinafter with reference to the accompanying drawings in which exemplary embodiments are shown. However, the inventive concepts may be embodied in many different forms and should not be construed as limited to the representative embodiments set forth herein.

With reference to the drawing figures, the inventive concepts disclosed herein are generally directed to console assemblies mountable within a passenger seating environment, for example, mountable to premium class aircraft passenger seating monuments or other structures. The console assembly may be retained in place by the structure such that stowage portions of the console assembly are disposed within reach of a seated user (e.g., less than arms-length along one side of an aircraft passenger seat), such that the console assembly does not interfere with use of the seat space, legroom space, footwell or alcove adjacent the seated user. The console assembly may include spaced upper and lower tiers configured to secure items and/or house electronics, wherein the spaced tiers may be vertically spaced and aesthetically integrated into the designed space, rather than separate stowage fixtures conspicuously obtruding in a bulky or disjointed manner. The console assembly may allow the user to easily view and retrieve stowed items and mounted devices without impacting seat ingress and egress. The console assembly may be mounted directly or indirectly to the sides and/or surfaces of a structure via a mounting panel integrated with a vertical back panel of the console assembly, from which the upper and lower tiers horizontally extend. Additionally, the console assembly may include a modular front panel on the lower tier for mounting electric devices, such as power ports or in-flight entertainment controls, for example. The modular electric mounting panel may allow the user easy access to and clear visibility of in-flight entertainment control devices and power ports for charging devices, as well as the ability to freely switch out the mounted electric devices as repair and/or replacement is needed. Thus, the user may enjoy the convenient layout of the console assembly, which can be used, for example, as a working surface, storage space for large and small items, fixture for devices, food and beverage tray, etc.

In addition to the user benefits derived from the modular console assembly, the modifiable features of the disclosed console assemblies facilitate installation into many different structures or monuments, regardless of the seating dimensions and configuration. Accordingly, the console assemblies of the present disclosure may be mass-produced as modular fittings for any type of structure, monument, seating arrangement, table, desk, alcove, surface, interface, furniture, etc.

Further, the console assembly may be equipped with various tray features on the lower tier portion, including assorted inserts, shapes, sizes, and configurations, which are readily interchangeable for holding different items, for example, beverage containers, portable electronic devices, etc. The lower tier portion, accessories, and other console assembly components may be made from durable light-weight materials including, but not limited to, plastics and aluminum. The lower tier portion may further include attachments and/or tray table extensions, such as a bi-folding assembly with different surface treatments and/or sculpted receptacles on one side for use with specific devices, consumables, or other items, and a flat and durable surface on the other side for adapting to many kinds of tasks. Further, the console assembly may be faced with veneers and/or branding to match or enhance the cabin aesthetics.

Referring to FIG. 1, a non-limiting example of a premium class aircraft passenger seat arrangement is shown generally at reference numeral 100, as one of many possible exemplary environments suitable for use with the console assembly 102 embodiments disclosed herein. The console assembly 102 is shown affixed to a vertical wall of the environment, for example, affixed to a vertical face of a partition wall near the passenger seat 110. The console assembly 102 is shown with an upper tier 104 disposed above and spaced apart from a lower tier 106, where both the upper tier 104 and lower tier 106 are affixed to and extend horizontally away from or forward of a vertical back panel 108. The vertical back panel 108 of the console assembly 102 is shown mounted to the wall of the environment, for example, facing in substantially the same facing direction of the passenger seat 110. The console assembly 102 is installed within the premium class aircraft passenger seating arrangement 100 such that a passenger sitting in a passenger seat 110 may easily access and view items stored within the stowage portions of the console assembly 102. The vertical, condensed arrangement of the console assembly 102 may allow for additional storage space, without including encroaching or obtrusive storage fixtures into the seat space. Thus, because of the storage areas and surfaces available in the vertically stacked and condensed console assembly 102 positioned to one side of the passenger seat 110, the passenger may enjoy free space in front of the passenger seat 110, such as in the footwell or alcove 112 of the premium class aircraft passenger seating arrangement 100, for example.

Figure 2:
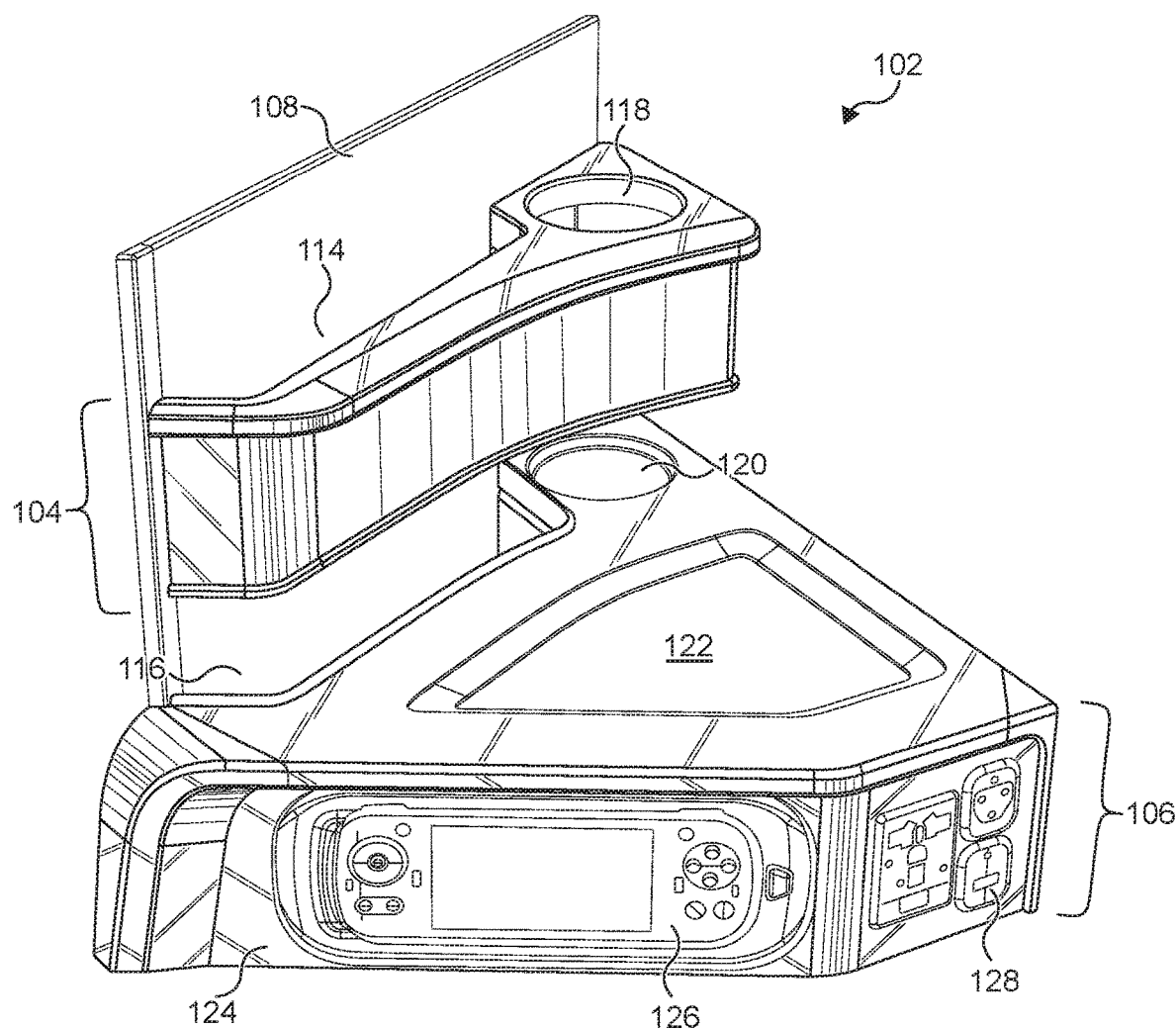
FIG. 2 is a perspective view of the console assembly of FIG. 1 shown including a front panel for electric devices and isolated from the aircraft passenger seat environment.

FIG. 2 shows the console assembly 102 of FIG. 1 including the upper tier 104 and the lower tier 106 isolated from the environment of a premium class aircraft passenger seat. The lower tier 106 may extend horizontally further from the vertical back panel 108 as compared to the upper tier 104. This may provide space on the top surface of the lower tier 106 for the passenger to place items, food, drinks, etc. free of obstruction from the upper tier 104. The upper tier 104 and the lower tier 106 may include stowage portions. In some embodiments of the console assembly 102, the upper tier 104 and the lower tier 106 may include vertically aligned stowage compartments, in which items seated in the stowage portion of the lower tier 106 may be retained by the stowage portion of the upper tier 104. For example, as shown in FIG. 2, the upper tier 104 may include a cutout near the vertical back panel 108 that forms an upper stowage portion 114, and the lower tier 106 may include a depression or cutout near the vertical back panel 108 that forms a lower stowage portion 116. The combination of the upper stowage portion 114 and the lower stowage portion 116 may provide storage for literature, such as an airline magazine and/or aircraft safety card and other tall, light weight items, for example. Using the tiered console assembly, an airline may prominently display their materials for passengers in a more organized and inviting manner. Moreover, the vertical thickness of the upper tier 104, the lower tier 106, and the spaced-apart distance between the two may be based on a standard literature height and/or an average of regional standards in order to fulfill international variations with one console assembly design. Additionally or alternatively, the console assembly 102 may employ a modular design approach for the height of the upper tier 104 in relation to the lower tier 106 through adjustable attachment or affixing of the upper tier 104 and/or lower tier 106 to the vertical back panel 108.

Some embodiments of the console assembly 102 may further include at least one additional vertically aligned stowage compartment cooperatively formed between the upper tier 104 and the lower tier 106. As is shown in FIG. 2, the upper tier 104 may include a cutout or bore through the upper and lower surfaces of the upper tier 104 adjacent the upper stowage portion 114, forming a second upper stowage portion 118. The lower tier 106 of the console assembly 102 may include a corresponding depression or bore in the top surface of the lower tier 106 near the lower storage portion 116 and the vertical back panel 108, forming a second lower storage portion 120. The second upper storage portion 118 and the second lower storage portion 120 may be cylindrically shaped and vertically aligned to accommodate beverage containers, for example.

Other embodiments of the console assembly may include additional stowage compartments and/or features integrally formed in the upper and lower tiers, thus harnessing the negative space for aesthetic storage opportunities.

The upper tier 104 of the console assembly 102 may further include an ambient lighting feature. For example, the top surface of the upper tier 104 may extend horizontally away from the vertical back panel 108, forming an overhanging lip, in which a light fixture or element may be disposed. The light of the upper tier 104 may be variable to match customized colors, material, and/or finish trim located along the front face of the upper tier 104, the vertical back panel 108, and/or the lower tier 106. As one non-limiting example, the ambient light may be an LED fiber optic cable light, integrated into the limited space of the console assembly 102. Controls for the ambient lighting of the console assembly 102 may be located on the console assembly 102 itself (e.g., on the front face of the lower tier 106) and/or integrated with a central hub for the premium class aircraft seat or suite. Additionally or alternatively, ambient lighting controls may be integrated into a central hub for the cabin and/or aircraft.

The lower tier 106 of the console assembly 102 may further include a depressed or debossed portion 122 in the top surface of the lower tier 106. The debossed portion 122 may provide containment for small items and/or spilled liquids. For example, the debossed portion 122 may function as an enlarged cocktail tray area, in which spillage and/or pooled condensation may collect and remain isolated from other areas of the console assembly 102, monument, and seating area.

The lower tier 106 may include a front panel 124, as shown in FIG. 2, for mounting electric devices, such as power ports, data ports, and in-flight entertainment devices. The front panel 124 may be modular to accommodate equipment repairs and/or replacement. For example, as in-flight entertainment technology evolves, handset or cradle devices may be upgraded for augmented and/or virtual reality handset devices, etc. The front panel 124 of the lower tier 106 may include two or more faces to organize various electric devices. Specifically, as shown in FIG. 2, the front panel 124 may include a first face for mounting an in-flight entertainment device 126 set at an obtuse angle with respect to a second face 128, in which power or data ports are mounted. Data ports may include but are not limited to PC video, RJ-11, RJ-45, USB and HDMI ports. Power ports may include AC or DC power at 110V, 120V, 15V, or 5V for example, with standard Type A-L plugs, USB, proprietary, or other outlet configurations. The in-flight entertainment device 126 may include a touch screen passenger control unit (TSPCU) that permits the passenger to control motorized adjustments of particular seat portions and/or ambient lighting, as desired. Additionally, the front panel 124 may include a passenger service unit (PSU) for calling attendants, controlling lights, air, and temperature, etc.

The placement of the in-flight entertainment device 126 may be advantageous visually and ergonomically in that the in-flight entertainment device 126 is out in the open, clearly visible (as opposed to being stowed away), and presented facing the user, yet still organized and uncluttered in the designated arrangement on the first face of the front panel 124. Likewise, power and data ports may be arranged on the second face 128 further from the passenger to accommodate wires and free space adjacent the passenger from plug adapters that could uncomfortably catch on items, clothing, and/or appendages. The relative shape configuration of the first and second faces of the front panel 124 of the lower tier 106 may resemble a narrowing wedge or triangle as shown in FIG. 2. This advantageously allows for unique and/or tight fits in smaller alcoves or monument areas, especially where space is at a premium. Moreover, the sleek tapering design may conveniently allow for better peripheral views out aircraft windows and an overall open feel without an impression of confinement within the passenger seating area.

Figure 5:
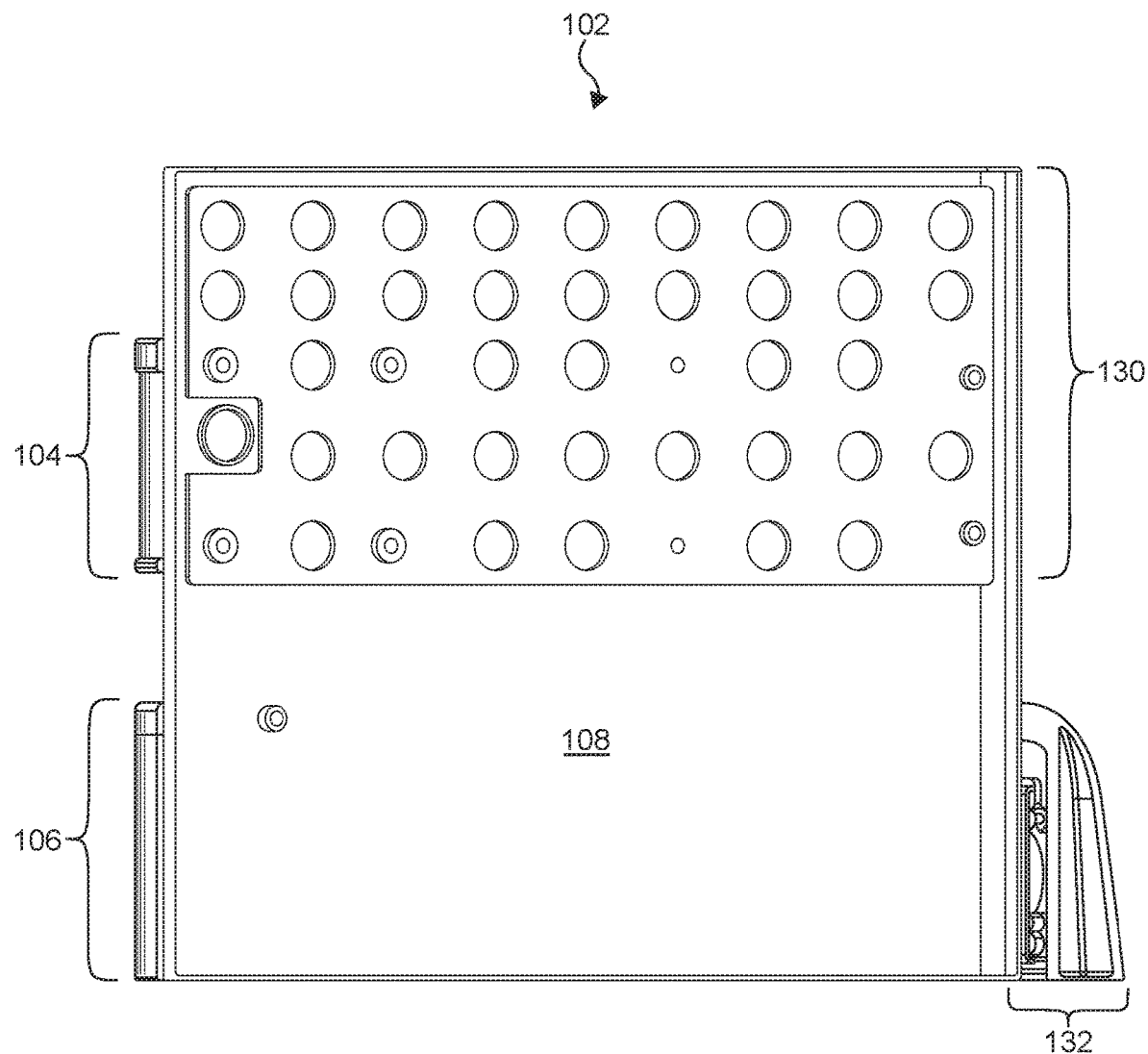
FIG. 5 is a rear view of the console assembly of FIGS. 1-4 shown including a mounting panel.

The lower tier 106 of the console assembly 102 may accommodate a cord reel for the in-flight entertainment device 126 beneath the top surface of the lower tier 106. Any other electric devices mounted in the front panel 124 of the lower tier 106 may also be provided with hidden space under the top surface of the lower tier 106 of the console assembly 102 for storing or routing wired connections and/or cordless power supplies. The vertical back panel 108 may include openings below the top surface of the lower tier 106 for routing wires and/or other connections to/from the monument. Additionally or alternatively, the lower tier 106 of the console assembly 102 may wrap partially extend behind the side of the vertical back panel 108 (as shown in FIG. 5) to accommodate wires traveling between the monument and the console assembly 102.

The vertical back panel 108 may overlap multiple composite panels of the monument in the passenger seating area in the installation and attachment of the console assembly 102. The continuous plane of the single vertical back panel 108 provides a more unifying feel for the console assembly 102 area and further ensures smooth ingress and egress of stowed literature that prevents damage to the edges and/or pages of the media.

In some embodiments of the console assembly, the upper tier may incorporate a more modular design, in which the upper tier with open stowage compartments may be replaced with an enclosed stowage cabinet. The enclosed stowage compartment may offer further security and privacy for passenger items and/or offerings from the airline.

Figure 3:
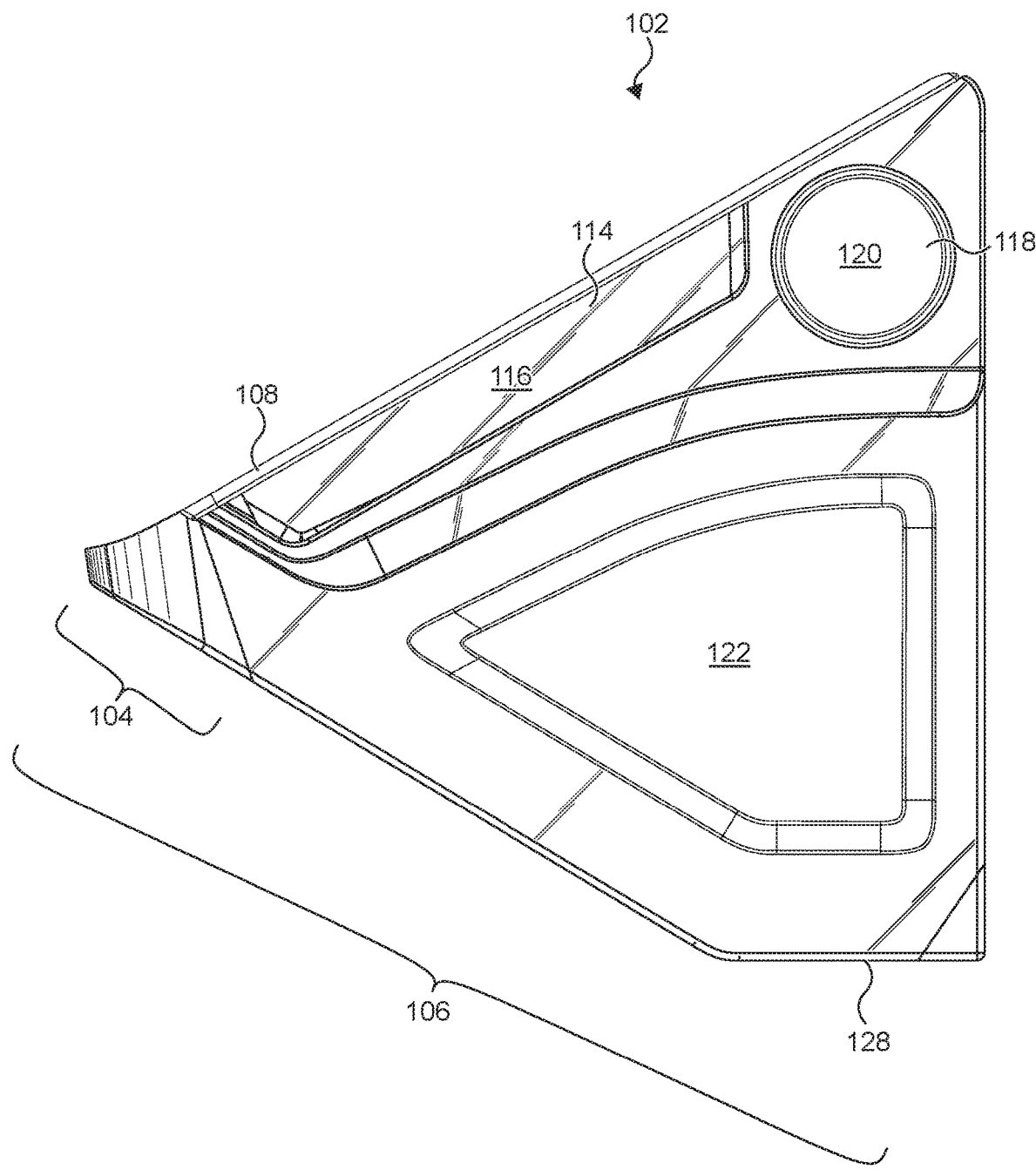
FIG. 3 is top plan view of the console assembly of FIGS. 1-2.

FIG. 3 shows the top surfaces of the upper tier 104 and the lower tier 106 of the console assembly of FIGS. 1-2. As shown, the debossed portion 122 of the lower tier 106 is positioned in front and clear of the upper tier 104. Additionally, the back curve of the debossed portion 122 parallels the curve of the front face of the upper tier 104. FIG. 3 also illustrates the vertical alignment of both the upper stowage portion 114 of the upper tier 104 with the lower stowage portion 116 of the lower tier 106 and the upper stowage portion 118 of the upper tier 104 with the lower stowage portion 120 of the lower tier 106. FIG. 3 further shows the obtuse angle formed by the first face of the front panel 124 with the second face 128 of the front panel 124.

Figure 4:
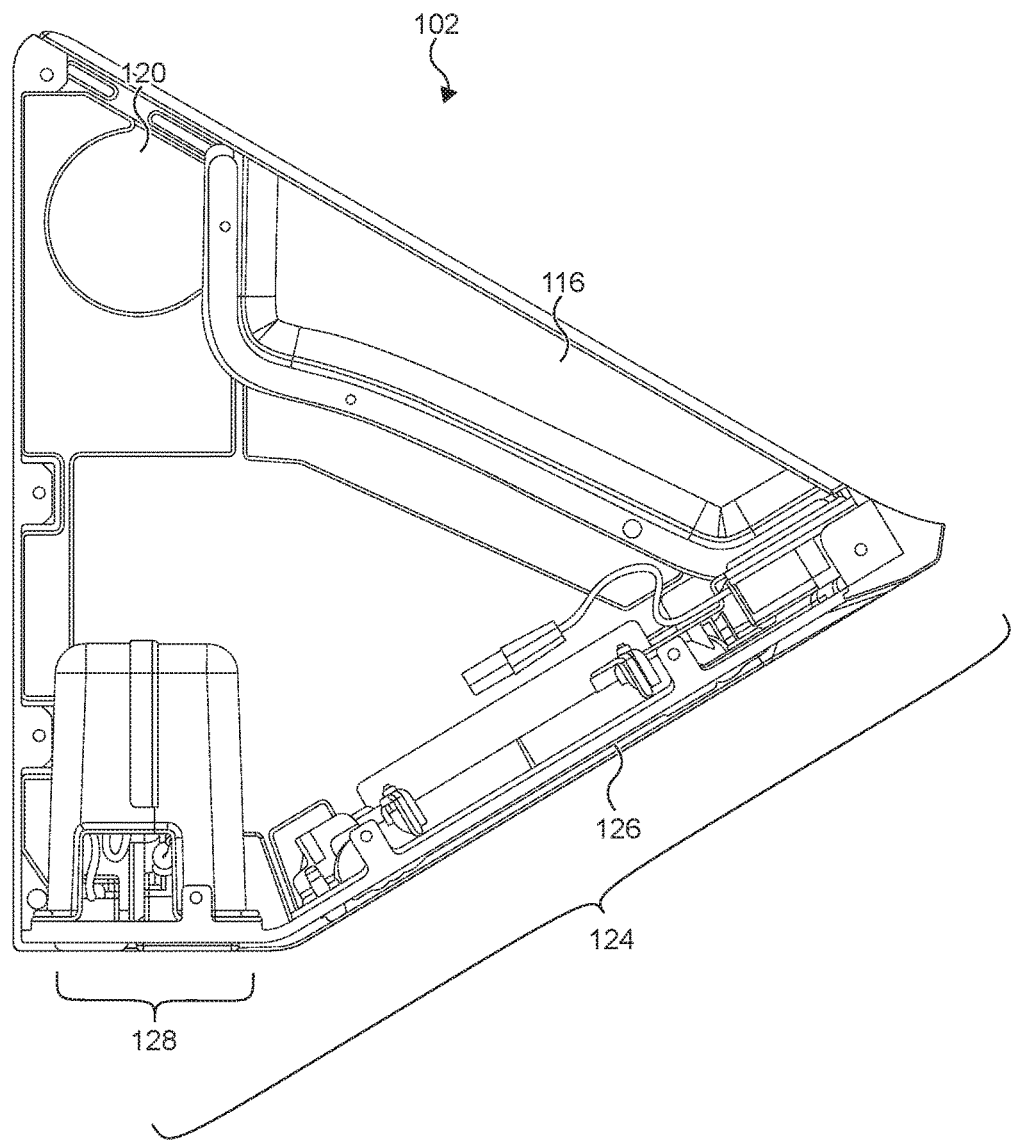
FIG. 4 is a bottom plan view of the console assembly of FIGS. 1-3 shown with electric device wiring.

FIG. 4 shows the console assembly of FIGS. 1-3 from underneath the lower tier 106 such that the wiring for the mounted electric devices may be seen. As shown, there is room for storing additional wiring and components within the underside of the lower tier 106, hidden from view.

FIG. 5 shows the back of the console assembly of FIGS. 1-4 from the rear, where a mounting panel 130 of the vertical back panel 108 and extension of the lower tier 106 beyond the side of the vertical back panel 108 can be seen. The mounting panel may provide an adjustable mechanism for attaching both the console assembly 102 to the monument, composite shell, or other environmental structures and the upper tier 104 and the lower tier 106 to the vertical back panel 108. Additionally, the lower tier 106 of the console assembly 102 may include an extension portion 132 that partially extends behind the side of the vertical back panel 108 to accommodate wires traveling between the monument and the console assembly 102.

The foregoing description provides embodiments of the inventive concepts by way of example only. It is envisioned that other embodiments may perform similar functions and/or achieve similar results. Any and all such equivalent embodiments and examples are intended to be covered by the appended claims.

What is claimed is:

1. A console assembly, comprising:
 a vertical back panel;
 a lower tier affixed to the vertical back panel and extending horizontally therefrom, the lower tier having a top surface for placing items and a front surface for mounting at least one electronic device, the lower tier comprising a lower stowage portion formed by a cutout positioned along a back of the lower tier near the vertical back panel, and a lower debossed portion formed in the top surface of the lower tier; and
 an upper tier affixed to the vertical back panel and extending horizontally therefrom, the upper tier detached from the lower tier, and the upper tier positioned above and spaced apart from the lower tier, the upper tier comprising an upper stowage portion formed by a cutout positioned along a rear of the upper tier near the vertical back panel and positioned directly above and in alignment with the lower stowage portion of the lower tier, and the upper tier further comprising a bore disposed through a thickness of the upper tier vertically aligned with the lower debossed portion.

2. The console assembly of claim 1, wherein the upper tier extends horizontally away from the vertical back panel a first distance, and the lower tier extends horizontally away from the vertical back panel a second distance greater than the first distance.

3. The console assembly of claim 1, wherein the upper tier comprises an overhanging lip formed along a front of the upper tier.

4. The console assembly of claim 1, further comprising at least one electronic device mounted in the front surface of the lower tier, wherein the at least one electronic device includes at least one of a power port, a data port, and an in-flight entertainment control panel.

5. The console assembly of claim 1, wherein each of the bore and the lower debossed portion are cylindrical, and wherein the bore and the lower debossed portion are vertically aligned such an item disposed therein is configured to seat in the lower debossed portion and be retained by the bore.

6. The console assembly of claim 1, wherein the lower tier further comprises a second lower debossed portion formed in the top surface of the lower tier, wherein the second lower debossed portion is positioned forward of the upper tier and apart from the vertical back panel.

\* \* \* \* \*